United States Patent [19]
Wissmann

[11] Patent Number: 5,634,953
[45] Date of Patent: Jun. 3, 1997

[54] EXTRUDER VENTING SYSTEM WITH VACUUM SHUTTLE VALVE

[75] Inventor: Siegfried R. Wissmann, Cincinnati, Ohio

[73] Assignee: Cincinnati Milacron Inc., Cincinnati, Ohio

[21] Appl. No.: 425,528

[22] Filed: Apr. 20, 1995

[51] Int. Cl.⁶ .................................................. B01D 46/00
[52] U.S. Cl. ............................. 55/312; 55/344; 55/350.1; 55/422; 366/75; 425/203
[58] Field of Search ........................... 55/212, 312, 314, 55/320, 337, 344, 345, 350.1, 385.1, 422, 467; 366/75; 425/203, 812

[56] References Cited

U.S. PATENT DOCUMENTS

| | | |
|---|---|---|
| 3,193,877 | 7/1965 | Edwards . |
| 3,814,563 | 6/1974 | Slaby et al. ............................. 425/203 |
| 3,833,121 | 9/1974 | Singleton et al. ....................... 210/91 |
| 4,181,510 | 1/1980 | Sano et al. . |
| 4,186,773 | 2/1980 | Flynn ...................................... 137/625.3 |
| 4,247,519 | 1/1981 | Sano ....................................... 422/169 |
| 4,334,552 | 6/1982 | Blanchard ........................... 137/625.48 |
| 4,431,028 | 2/1984 | Hendrick ............................. 137/625.3 |
| 4,516,606 | 5/1985 | Worley ................................. 137/625.3 |
| 4,632,564 | 12/1986 | Kopernicky .............................. 425/203 |
| 4,814,186 | 3/1989 | Trott ........................................ 55/312 |
| 5,123,828 | 6/1992 | Surface .................................... 425/203 |
| 5,297,864 | 3/1994 | Knoll et al. ............................... 366/75 |
| 5,385,462 | 1/1995 | Kodama et al. ......................... 425/135 |

FOREIGN PATENT DOCUMENTS 56-31008  3/1981  Japan ..................... 425/203

*Primary Examiner*—C. Scott Bushey
*Attorney, Agent, or Firm*—Stephen H. Friskney

[57] ABSTRACT

The present invention provides a barrel venting system for use on an extruder. Gases that are generated during plasticizing are drawn by vacuum through a filter to remove plastic particles before the gas is exhausted to the atmosphere. To enable cleaning of the filter without interrupting extruder operation, a shuttle valve is provided to allow rapid switching of the gas flow to a second filter. The valve itself includes two disc shaped elements with ports that align in two positions to enable flow to either the first or second filter, as desired.

10 Claims, 4 Drawing Sheets

EXTRUDER VENTING SYSTEM WITH VACUUM SHUTTLE VALVE

BACKGROUND OF THE INVENTION

1. Field of the Invention

The present invention relates to a barrel venting system used with an extruder to remove gases generated during plasticizing, and more particularly, to such a venting system that includes a vacuum shuttle valve to control the flow of the vented gases through filtering means.

2. Description of the Related Art

When thermoplastic material is plasticized in an extruder, gases (air, water vapor, etc.) are generated in the process. Typically a vacuum is applied at the barrel of the extruder to draw off the gases since they might otherwise become entrained in the plastic melt and adversely affect the quality of the final extrusion. Removing the gases in this way causes small particles of plastic to be suspended in the flow and drawn out of the barrel with the gases. To avoid releasing the particles of plastic into the surrounding environment with the exhaust from the vacuum pump, a filtering system can be employed to separate the plastic particles from the flow of gases. In order to maintain efficient operation, such filtering systems require periodic cleaning to remove the accumulation of plastic particles from normal operation of the extruder.

It is important to maintain the vacuum on the barrel (to withdraw gases) even while the filter is being cleaned. Otherwise, the gases will become entrained in the material and the product extruded during the cleaning period will be of poor quality. One way to maintain the vacuum is to divert the flow of gases and plastic particles to the atmosphere temporarily, i.e., only as long as it takes clean the filter. A second possibility is to provide a bypass circuit for the gas flow that includes a second filter. Typically, such bypass arrangements have involved the use of two three-way valves 2 to switch the flow between the filters 4, see FIGS. 1a and 1b. Three-way valves have right angle changes in flow direction 6 and "dead end" passages 8 which tend to clog with the small plastic particles (often more like a powder) that are carried in the flow. Furthermore, in order not to interrupt the vacuum and potentially spoil a portion of the extruded product, the two valves must be operated simultaneously. However, there is no practical way to tell whether the valves were effectively operated; only close examination of the extruded product, after the fact, will tell whether the gases were properly extracted.

The prior art has failed to provide a venting system for an extruder that provides effective filtration of the gas flow and avoids potential interruption or unsatisfactory operation of the extruder while the filter is being cleaned.

SUMMARY OF THE INVENTION

Accordingly, an object of the present invention is to provide a venting system for an extruder that includes a vacuum shuttle valve to enable disconnecting the filter means for cleaning without interrupting the vacuum on the extruder barrel. A further object is to provide a vacuum shuttle valve that is simple in construction, easy to operate, and effective in function.

To accomplish these objectives, the present invention is directed to a venting system having a shuttle valve that enables a vacuum filter bypass, preferably including the connection of a second (alternate) filter system without noticeable interruption of the vacuum on the barrel.

Basically, the venting system includes a vent port in the extruder barrel, first and second filters, a source of vacuum, and a shuttle valve for switching the flow from one filter to the other. The shuttle valve itself comprises bores in opposing, rotatable discs, the bores coming into alignment to complete the gas flow circuit through the desired filter by a simple, quick, rotating movement. The design of the valve inherently provides simultaneous disconnection of one filter and connection of the other filter without a significant interruption of the vacuum, thereby allowing one of the filters to be cleaned while maintaining production quality.

DESCRIPTION OF THE PREFERRED EMBODIMENT

Figure 1A:
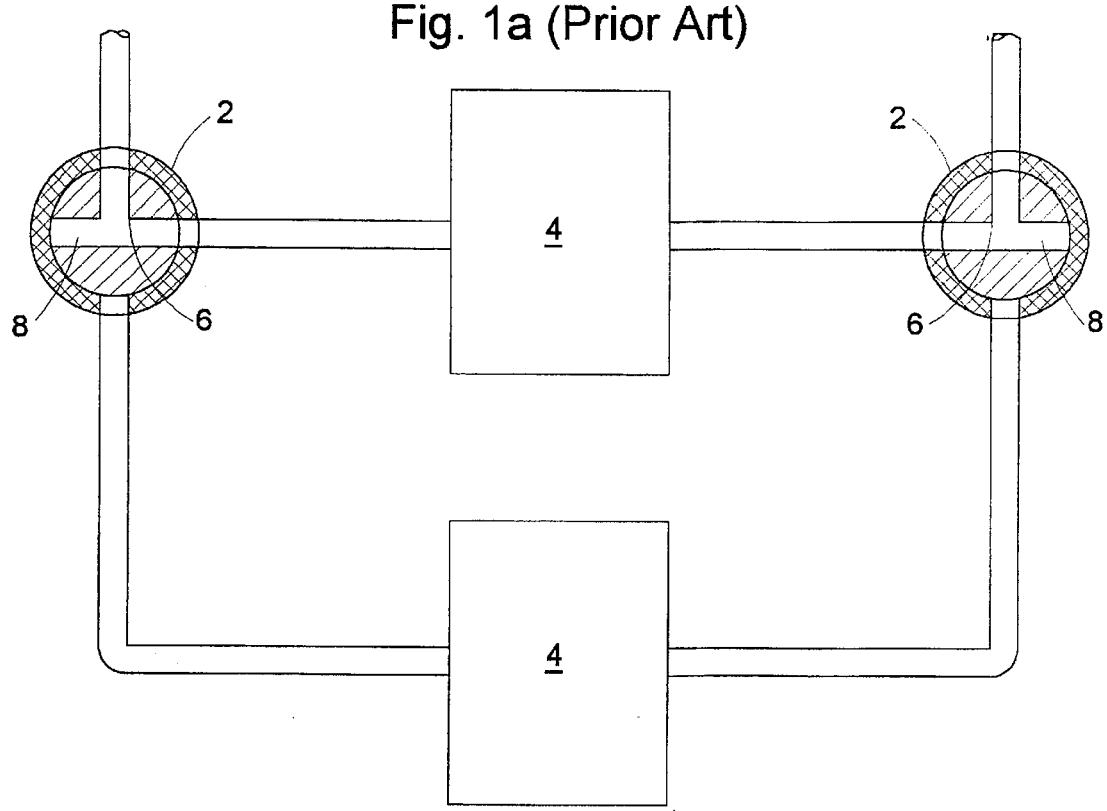
FIGS. 1a and 1b are schematic illustrations of a bypass filtering system for gases vented from an extruder, as taught by the prior art.
Figure 1B:
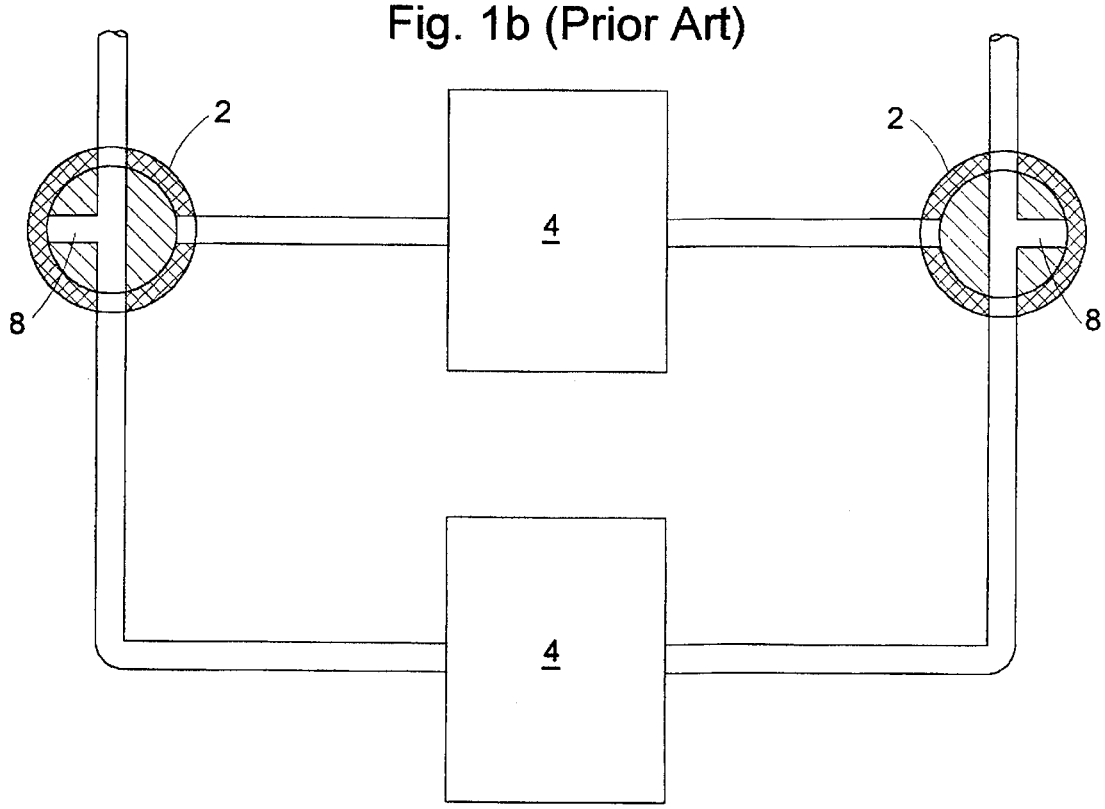
Figure 2:
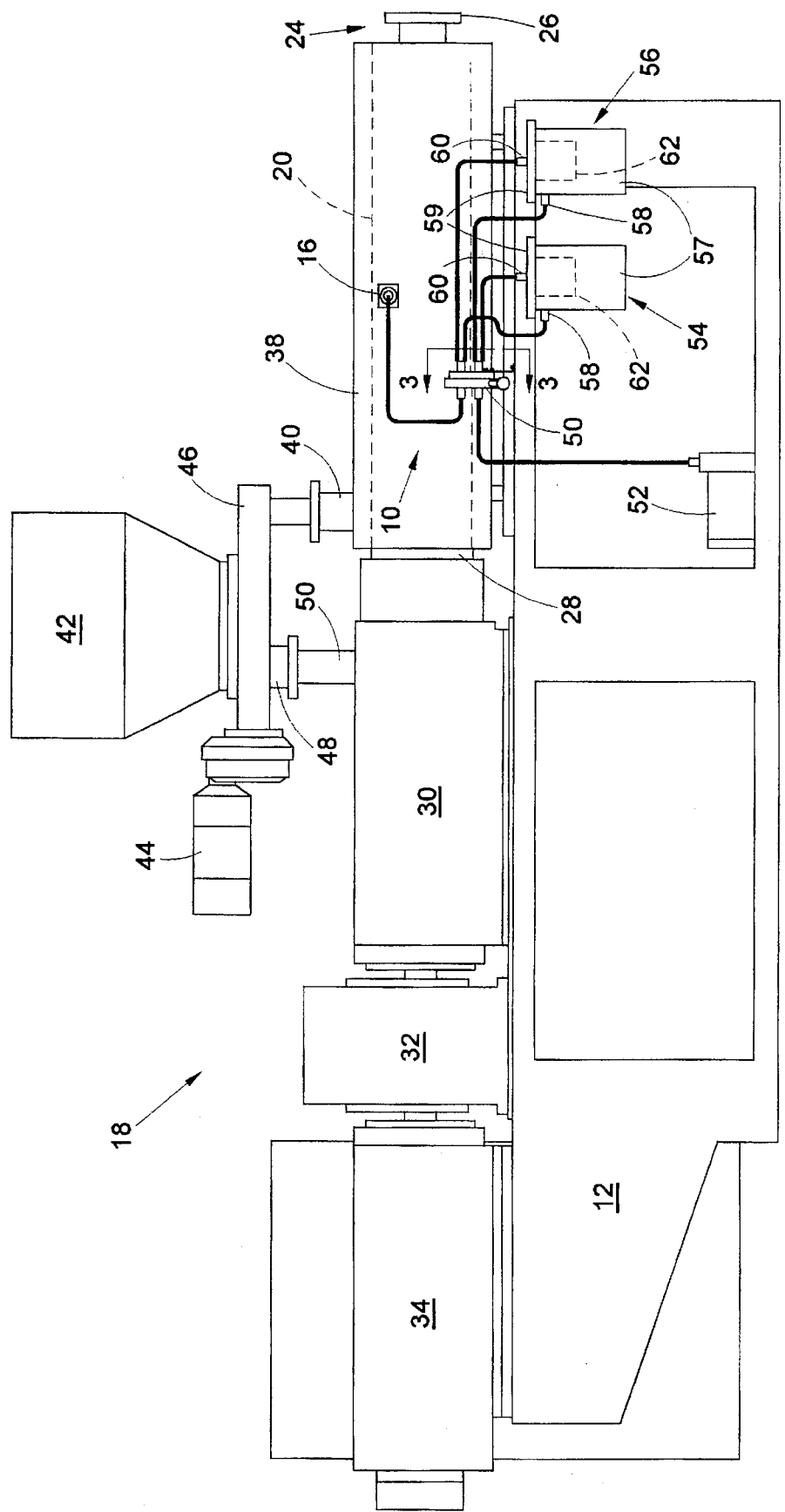
FIG. 2 is a semi-schematic rear view of a plastics processing extruder having a venting system according to present invention.
Figure 4:
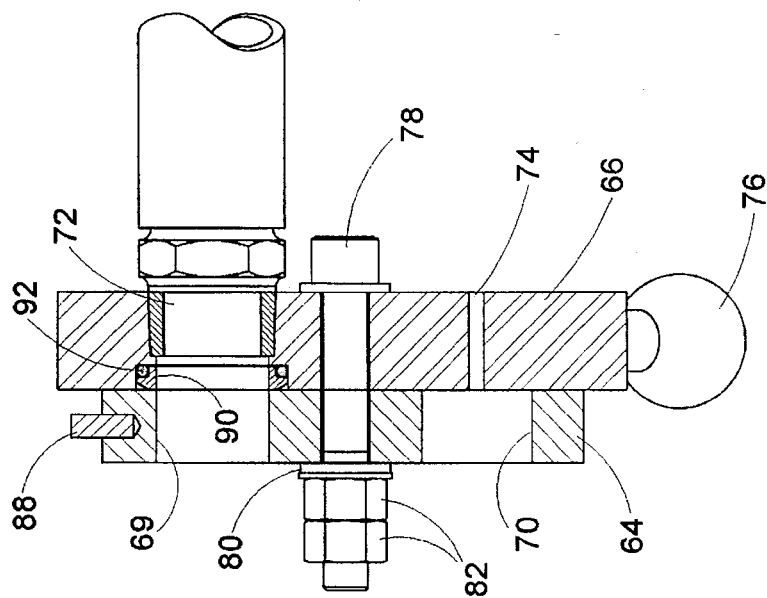
FIG. 4 is a section view of the vacuum shuttle valve, as taken along the line 4—4 of FIG. 3.
Figure 3:
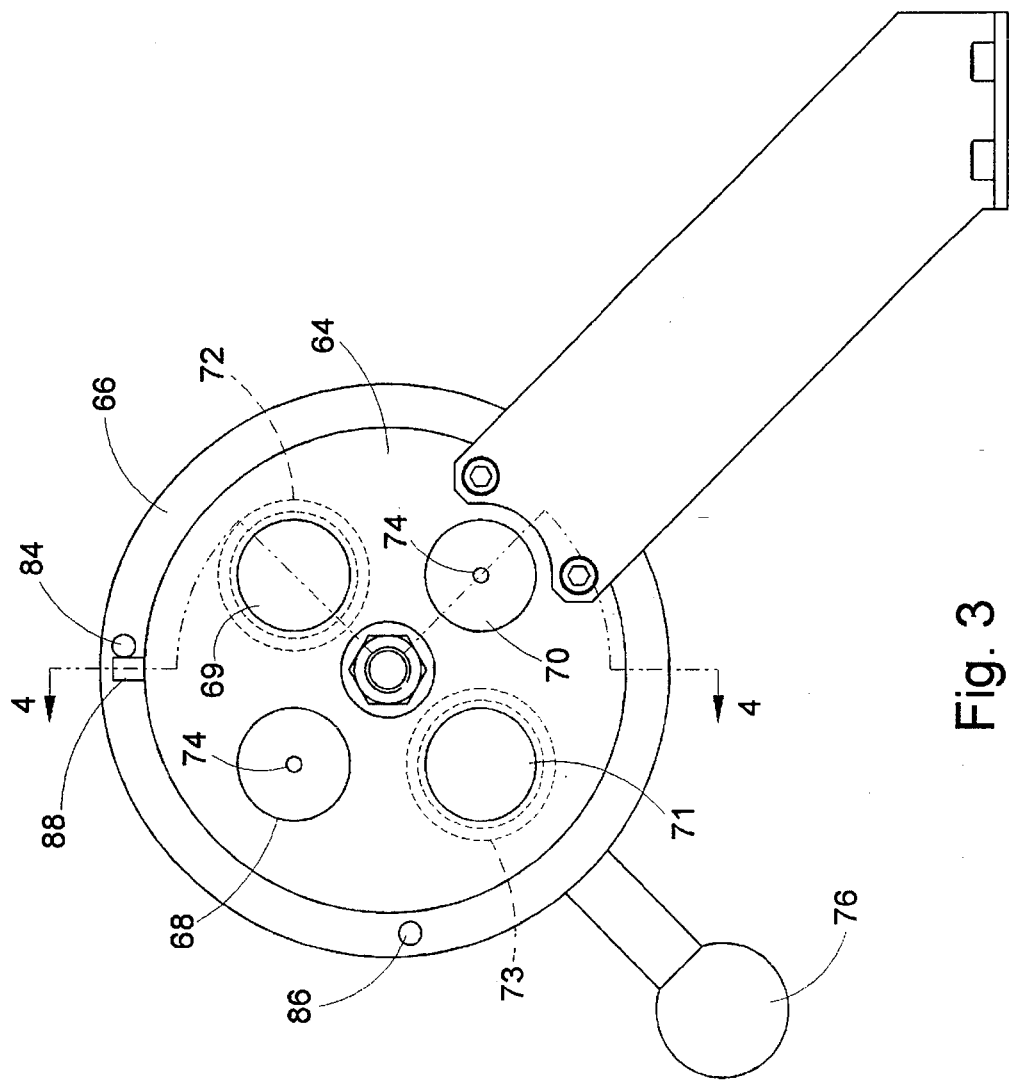
FIG. 3 is right side view of the vacuum shuttle valve according to the present invention, as taken along the line 3—3 of FIG. 2, with certain portions broken away for clarity.
Figure 5C:
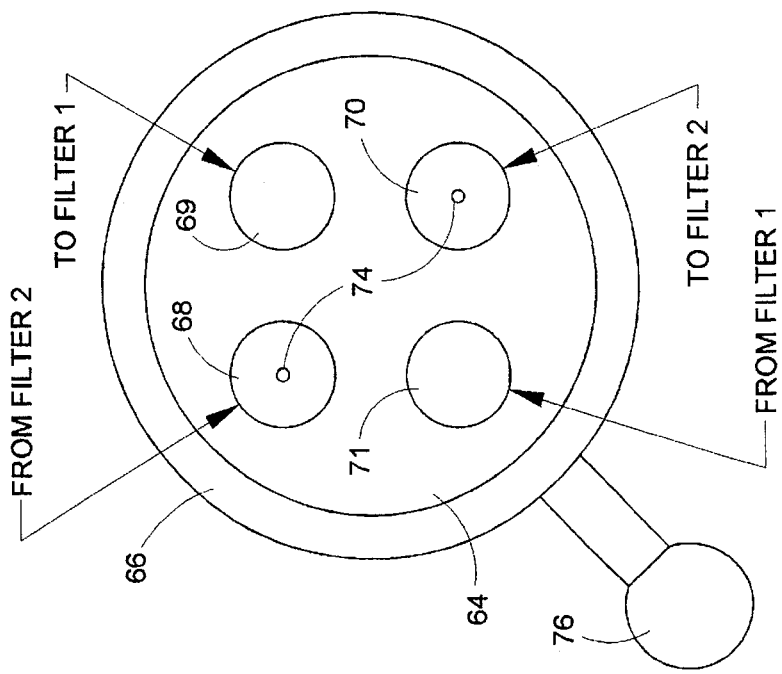
FIGS. 5a, 5b and 5c are diagrammatic views of the vacuum shuttle valve, specifically, the left side, front and right side respectively.
Figure 5B:
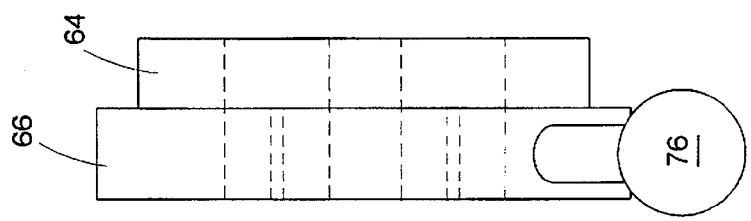
Figure 5A:
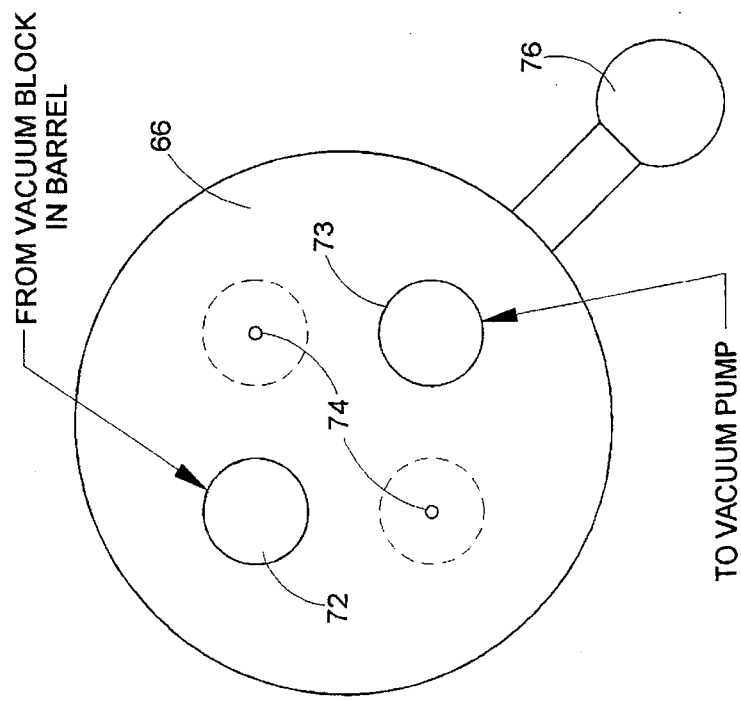

In order to clarify the features of the preferred embodiment, the venting system of the present invention will be described in conjunction with a plastics processing extruder. For purposes of this description, the specific type of extruder is not significant since all extruders produce some gases during plasticizing. For example, extruders having a single feed screw or multiple screws, as required for a particular application, will benefit from the present invention. Referring to the drawings, and particularly to FIG. 2 thereof, there is shown a venting system 10 for an extruder 18 which provides plasticized material to an extrusion die or other plastic forming apparatus (not shown).

The extruder 18 is supported on a machine base 12 defined by a generally rectangular, box-type frame having an overall structure that is wellknown to those skilled in the art. Extruder 18 incorporates a tubular barrel 20 that includes an inner, rotatable processing screw or screws (not shown) and a plurality of resistance-type heater bands (not shown) to apply heat to the exterior of barrel 20. The heater bands aid in softening the plastic material while the material is mechanically worked and conveyed within barrel 20 in a direction toward the barrel outlet 24 by the processing screw(s). Located in the barrel 20 at a strategic position for removal of gas and proximate the corresponding section of the processing screw(s), is a vent block 16 which provides an exit port for gases generated during plasticizing and a means for connecting a suitable conduit on the barrel 20.

Barrel 20 also includes a forward flange 26 at outlet 24, and a drive end 28 that permits a drive coupling (not shown) to couple the processing screw(s) with a drive gear system 30 which, in turn, is coupled with a reduction gearbox 32 that receives power from a screw drive motor 34, as is typical in the art. Barrel 20 is provided with an outer cover 38 that has a generally rectangular cross section and that has its inner surfaces spaced from the outer surface of barrel 20 and from the surrounding of heater bands. Adjacent drive end 28 of barrel 20 is a plastics material inlet 40 that receives pelletized or powdered plastic material that is placed in a feed hopper 42. The material is transported to inlet 40 by means of a drive motor 44 that rotates an auger (not shown) carried within a tubular housing 46. Hopper 42 and tubular housing 46 are partially supported by the casing of drive gear system 30 by a feeder support member 48 that is carried by a support bracket 50.

The venting system 10 includes a vacuum shuttle valve 50, as will be described in detail in the following paragraphs. The valve 50 is connected by suitable conduits to the vent block 16, a vacuum pump 52, a first canister 54 and a second canister 56. The canisters 54,56 are preferably identical, having a hollow cylindrical body 57 with an inlet 58, a detachable lid 59 with an outlet 60, and an internal filter element 62 adjacent the outlet 60. The inlet 58 is configured to intersect tangentially with the interior of the cylindrical body 57. This configuration for the inlet to the canisters 54,56 serves to assist in separating the particles from the gas by creating a centrifugal effect as the flow enters at a relatively high speed. The filter element 62 removes the lighter particles (that are not significantly affected by the centrifugal force and remain suspended) from the flow before it exits the canister through the outlet 60.

Referring now to FIGS. 3, 4 and 5a–5c, the preferred embodiment of the vacuum shuttle valve 50 of the venting system 10 of the present invention is shown. The main body of the valve 50 is comprised of two disc-shaped members, a stationary disc 64 and a rotating disc 66. The stationary disc 64 has four pods 68,69,70,71 that connect to the inlets 58 and outlets 60 of the canisters 54,56. The rotating disc 66 has two ports 72,73; port 72 connects via a conduit to the vent block 16 and port 73 similarly connects to the vacuum pump 52. Rotating disc 66 further includes two bleed holes 74 and has a handle 76 attached to facilitate rotational movement of the disc 66.

To facilitate relative rotation of the discs, each has an axial bore to receive a pin around which to rotate, such as a bolt 78. To hold the adjacent surfaces of the discs closely together, a belleville spring 80 and nuts 82 are used with the bolt 78. To minimize leakage between aligned ports of the discs 64,66, a sealing ring 90 and O-ring 92 a provided in disc 66 concentric with each of the ports 72,73. Sealing ring 90 is preferably formed from a durable, low surface friction material, such as PTFE. The O-ring 92 serves as a seal between the ring 90 and the mounting recess in disc 66, while also providing some resilience for this sealing arrangement.

As is apparent from the drawings, rotation of disc 66 relative to disc 64 alters the alignment of the ports in the respective discs. To facilitate repeatable positioning, pins 84,86 in disc 66 and pin 88 in disc 64 are used as positive stops for the limits of rotation for disc 66. For example, with the discs 64,66 in the relative position shown in FIG. 3, pin 84 is stopped against pin 88; this aligns port 69 with port 72, port 71 with port 73, and the bleed holes 74 with ports 68,70. This valve position provides for filtering through canister 54 by connecting the vacuum block 16 (port 72) to the inlet 58 of canister 54 (port 69), and the outlet 60 of canister 54 (port 71 ) to the vacuum pump 52 (port 73). The bleed holes 74 facilitate the cleaning operation by allowing the internal pressure of canister 56 to equalize at ambient.

For the alternate (bypass) valve position (not shown), disc 66 is rotated 90 degrees so that pin 86 is stopped against pin 88, thus aligning port 68 with port 73, port 70 with port 72, and the bleed holes 74 with ports 69,71. This valve position relieves the vacuum on canister 54 (via the bleed holes 74) and provides for filtering through canister 56. Specifically, the vacuum block 16 (port 72) is connected to the inlet 58 of canister 56 (port 70), and the outlet 60 of canister 56 (port 68) is connected to the vacuum pump 52 (port 73).

The operation of the venting system 10 of the present invention will now be described in connection with its use on a plastics processing extruder, as shown. The extruder 18 is operated to plasticize thermoplastic material and is controlled in any conventional manner, as through a single operator control panel containing the necessary switches, indicators, and controls. Ultimately, a flow of thermoplastic melt from the extruder enters the extrusion die assembly to issue as an extruded profile.

More specifically, the extruder 18 produces plastic melt by feeding in thermoplastic resin from the hopper 42, through the tubular housing 46, and into the material inlet 40 of the barrel 20. Once inside the barrel 20, the resin is mechanically worked and advanced toward the outlet 24 by the processing screw(s). The frictional heat generated by the mechanical working of the resin, along with supplemental heat provided by the heater bands, causes the resin to plasticize gradually into a uniform melt. During plasticizing process, gases are generated. The barrel 20 and feed screw(s) are specially configured in the area adjacent the vent block 16 to facilitate removal of the gases from the barrel 20. A vacuum is applied to the vent block 16 on barrel 20 by the vacuum pump 52. For example, in the filtering circuit that includes canister 54, a conduit from the vent block 16 connects to port 72 of the shuttle valve 50 which is aligned with port 69. The inlet 58 of canister is connected by a conduit to port 69, while the outlet 60 of the canister 54 is connected by a conduit to port 71 of the shuttle valve 50. Port 71 is aligned with port 73 which is connected by a conduit to the vacuum pump 52. This vacuum draws off the gases from the barrel 20 along with plastic particles suspended in the flow. Given the path of the flow through canister 54 as described above, the plastic particles are removed from the flow by centrifugal force and the filter element 62.

As processing of the thermoplastic resin continues, the accumulation of plastic particles in the canister 54 continues to build and begins to restrict flow through the system. When the canister 54 nears its capacity, the vacuum shuttle valve 50 is rotated to its alternate position so that the vacuum now draws the flow of gasses through canister 56 by connection of the inlet 58 and outlet 60 to the vent block 16 and vacuum pump 52, as described above with respect to canister 54. With the bypass flow established, the vacuum on canister 54 is released by bleed holes 74 and the operator is able to remove the accumulation of plastic particles from the canister 54 and prepare it for reuse. The shuttle valve 50 remains in the alternate (bypass) position until the canister 56 nears its capacity, making it necessary for the flow to be switched back to canister 54.

While the invention has been shown illustrated in some detail according to the preferred embodiment shown in the accompanying drawings, and while the preferred embodiment has been described in similar detail, there is no intention to limit the invention to such detail. On the contrary, it is intended to cover all modifications, alterations, and equivalents falling within the scope of the following claims. For example, instead of using two canisters for filtering, the shuttle valve 50 could be used to dived the flow generated by the vacuum pump 52 to the atmosphere temporarily while a single filter canister is cleaned, and then returned to the normal operating position to filter the flow.

What is claimed is:

1. A vent system for a plastics processing extruder having a barrel that houses at least one plasticizing feed screw, the vent system comprising:

a vent block in the barrel of the extruder, through which gases generated during plasticizing can exit the barrel;

first filter means for receiving gases from the extruder and removing particles of plastic carried along with the gases, the first filter means having an inlet and an outlet;

a shuttle valve having first and second members, the first member of the valve having an inlet port connected to the vent block in the barrel and an outlet port connected to a vacuum source, the second member of the valve having a first port connected to the inlet of the first filter means, a second port connected to the outlet of the first filter means;

the first and second members of the shuttle valve being capable of relative movement between a first position wherein the inlet port of the first member of the valve communicates with the first port of the second member, and the outlet port of the first member communicates with the second port of the second member, so that the vacuum source draws gases from the vent block and through the first filter means, and a second position wherein the vacuum source draws gases from the vent block in a path that bypasses the first filter means.

2. The apparatus of claim 1 wherein the valve members are disc-shaped with the first member being rotatable and the second member being stationary.

3. The vent system of claim 1 wherein the first filter means comprises a hollow cylindrical body, a detachable lid, and an internal filter element.

4. The apparatus of claim 3 wherein the inlet of the first filter means is configured to intersect tangentially with the interior of the cylindrical body.

5. The apparatus of claim 1 wherein the first valve member includes at least one bleed hole to allow pressure in the first filter means to equalize at ambient when the valve is in the second position.

6. A vent system for a plastics processing extruder having a barrel that houses at least one plasticizing feed screw, the vent system comprising:

a vent block in the barrel of the extruder, through which gases generated during plasticizing can exit the barrel;

first filter means for receiving gases from the extruder and removing particles of plastic carried along with the gases, the first filter means having an inlet and an outlet;

second filter means for receiving gases from the extruder and removing particles of plastic carried along with the gases, the second filter means having an inlet and an outlet;

a shuttle valve having first and second members, the first member of the valve having an inlet port connected to the vent block in the barrel and an outlet port connected to a vacuum source, the second member of the valve having a first port connected to the inlet of the first filter means, a second port connected to the outlet of the first filter means, a third port connected to the inlet of the second filter means, and a fourth port connected to the outlet of the second filter means;

the first and second members of the shuttle valve being capable of relative movement between a first position wherein the inlet port of the first member of the valve communicates with the first port of the second member, and the outlet port of the first member communicates with the second port of the second member, so that the vacuum source draws gases from the vent block and through the first filter means, and a second position wherein the inlet port of the first member of the valve communicates with the third port of the second member, and the outlet port of the first member communicates with the fourth pod of the second member, so that the vacuum source draws gases from the vent block and through the second filter means.

7. The apparatus of claim 6 wherein the valve members are disc-shaped with the first member being rotatable and the second member being stationary.

8. The vent system of claim 6 wherein the first filter means comprises a hollow cylindrical body, a detachable lid, and an internal filter element.

9. The apparatus of claim 8 wherein the inlet of the first filter means is configured to intersect tangentially with the interior of the cylindrical body.

10. The apparatus of claim 6 wherein the first valve member includes at least one bleed hole to allow pressure in the first filter means to equalize at ambient when the valve is in the second position.

* * * * *